(12) United States Patent
Bron

(10) Patent No.: US 12,074,868 B2
(45) Date of Patent: Aug. 27, 2024

(54) BIOMETRIC AUTHENTICATION SYSTEM BASED IN THE VENOUS NETWORKS AND UNIQUE NON-FALSIFIABLE CODES OF TREE STRUCTURES AND ASSOCIATED METHOD

(71) Applicant: VTIP SARL, Chalais (CH)

(72) Inventor: Christophe Bron, Chalais (CH)

(73) Assignee: Christoph Bron, Chalais (CH)

( * ) Notice: Subject to any disclaimer, the term of this patent is extended or adjusted under 35 U.S.C. 154(b) by 1155 days.

(21) Appl. No.: 16/096,566

(22) PCT Filed: Apr. 25, 2017

(86) PCT No.: PCT/IB2017/052362
§ 371 (c)(1),
(2) Date: Oct. 25, 2018

(87) PCT Pub. No.: WO2017/187332
PCT Pub. Date: Nov. 2, 2017

(65) Prior Publication Data
US 2020/0329033 A1 Oct. 15, 2020

(30) Foreign Application Priority Data
Apr. 27, 2016 (CH) .......................................... 55516

(51) Int. Cl.
*H04L 9/40* (2022.01)
*G06F 16/22* (2019.01)
*G06F 21/62* (2013.01)

(52) U.S. Cl.
CPC ...... *H04L 63/0861* (2013.01); *G06F 16/2246* (2019.01); *G06F 21/6254* (2013.01)

(58) Field of Classification Search
CPC . H04L 63/0428; H04L 63/10; H04L 63/0853; H04L 63/0407; H04L 63/0861;
(Continued)

(56) References Cited

U.S. PATENT DOCUMENTS 9,971,948 B1 * 5/2018 Herrington ............. G06F 21/32
2011/0002461 A1 1/2011 Erhart et al.
(Continued)

FOREIGN PATENT DOCUMENTS

CH 705412 A2 3/2013
JP 2011203822 A 10/2011

OTHER PUBLICATIONS

International Search Report of Aug. 2, 2017 for PCT/IB2017/052362.

*Primary Examiner* — Farid Homayounmehr
*Assistant Examiner* — Brian William Avery
(74) *Attorney, Agent, or Firm* — Maxwell L. Minch Esq. PA; Maxwell L. Minch

(57) ABSTRACT

The Present invention provides for a biometric authentication system, the method implemented in the system, and its use, based on venous networks, to provide a highly available system for resilient biometric authentication that does not require the possession or the memorization of confidential information of users while ensuring security, while allowing to discard the template and the images of the vascular network while having a tamper-proof system.

9 Claims, 3 Drawing Sheets

(58) Field of Classification Search
CPC .... G06F 21/6218; G06F 21/34; G06F 21/606; G06F 16/2246; G06F 21/32; G06F 21/6254
See application file for complete search history.

(56) References Cited

U.S. PATENT DOCUMENTS

| | | |
|---|---|---|
| 2013/0219193 A1 | 8/2013 | Baughman et al. |
| 2016/0112415 A1* | 4/2016 | Park .................... H04L 63/0853 713/186 |
| 2016/0267435 A1* | 9/2016 | Eid .......................... G08G 3/00 |
| 2017/0076146 A1* | 3/2017 | Saripalle .............. G06V 10/751 |
| 2017/0120106 A1* | 5/2017 | Puehse ............... G06Q 20/3224 |
| 2017/0308891 A1* | 10/2017 | deOliveira ........... G06Q 20/382 |

* cited by examiner

BIOMETRIC AUTHENTICATION SYSTEM BASED IN THE VENOUS NETWORKS AND UNIQUE NON-FALSIFIABLE CODES OF TREE STRUCTURES AND ASSOCIATED METHOD

TECHNICAL FIELD OF THE INVENTION

The invention relates to the field of biometric authentication based on venous networks. More particularly, the invention relates to a biometric authentication system based on unique and non-falsifiable encodings of tree structures. The invention further relates to the method implemented in the authentication system and to the use of the system.

STATE OF THE PRIOR ART

Conventionally, the biometric systems are closely related to a person because they can use a unique feature of each other for identification or authentication purposes. If the person's biometric data may be deleted or modified, this is not the case of the source from which they originate.

At present, the state of the art is based on a non-contact capture of the venous network by a detector when the hand or another part of a body is illuminated by a light in the near-infrared. The invention provides a client with a device for describing the characteristics of the venous network, providing a post-processed image of the individual vascular network (template). The template is registered at a first time on an identification server and is compared to the template generated at the time of the user authenticates. However, it is necessary to strictly manage the template as personal information, which requires a high management cost. Even if the information is strictly managed, many users are still reluctant to register a template for privacy reasons. Furthermore, the number of samples of a type of biological information possessed by an individual is limited. For example, the number of fingers from which the fingerprints can be collected is only ten for a person. Thus, it is not easy to frequently change the template unlike passwords and encryption keys. If a template is disclosed, there is a risk that the template can be reproduced, so the biometric authentication cannot be used. Further, when the same is being monitored, the system is also faced with a threat.

Thus, it has been proposed that biometric authentication that records and verifies the correspondence of the feature amount of the biometric information protected by an appropriate encryption. More precisely, at the time of recording, the template (the amount of features to be registered) is submitted to a conversion (corresponding to the encryption) using a secret conversion parameter (corresponding to an encryption key). The converted model template is registered in the server database. At the same time, the conversion parameter is stored in a smart card and is delivered to the user. At the time of authentication, the user enters the biometric information, at the authentication terminal (client), as well as the conversion parameter. The terminal extracts the feature amount of the user's biometric information and converts it, and then transmits it to the server. The server compares the stored template stored in the database from the customer. If the two sets of data are sufficiently close to each other, the server determines an acceptance, or otherwise uttering a rejection. The conversion parameter may be generated from secret information such as a password stored by the user. Such authentication method is called resilient biometric authentication.

The advantage of this method is that the user secretly holds the conversion parameter, the server cannot know the original feature amount, even in the authentication. Thus, the privacy of the user is protected. Further, even if the model has leaked, it is possible to ensure security by modifying the conversion parameter to regenerate a template, and again recording the generated template. When the same biometric information is used in other systems, the template is converted by different parameters to register different template in the respective systems. With this configuration, if a template is disclosed from one of the systems, the security of other systems cannot be compromised.

In the resilient biometric authentication described above, it is necessary for a user to securely manage the conversion parameter. Thus, the user must have a smart card to store the conversion parameter, or memorize secret information to generate the conversion parameter. This results in a degradation of the inherent availability of the biometric authentication, wherein the conversion parameter can be lost or forgotten. Further, the conversion parameter may be stored in the client device. However, in general, it is difficult to ensure the security of the client. Thus, additional costs are required to provide protection mechanisms, such as sabotage resistance, or to prevent leakage. Further, when an indeterminate number of users share a plurality of terminals such as automated teller machines and terminal kiosks, it is necessary to manage the conversion parameters of all users of each terminal. This would not be realistic in security terms and operational costs.

It is desirable to provide a highly available system for resilient biometric authentication that does not require the possession or the memorization of confidential information of users while ensuring security.

The aim is not to keep the template and the images of the vascular network while having a tamper-proof system.

SUMMARY OF THE INVENTION

The aim of the invention is to overcome the disadvantages of the prior art and in particular to propose a non-nominative, resilient biometric authentication system based on venous networks, comprising a light source (preferably but not exclusively infrared), for illuminating a body part of an user, and a detection device, comprising a sensor for capturing without contact a venous network of said part of the body of the user illuminated by said light, a biometric feature extraction unit referred to as template, and a biometric template conversion unit. Detection device having a unique identifier, said biometric feature extraction unit extracting a feature quantity from the biometric information obtained by the sensor and generating a vascular fingerprint. The system is characterized in that the feature conversion unit is able to convert said vascular fingerprint, via an encoding algorithm, combining the identifier of the device with the extracted features, into a variable numerical identifier, so that said numerical identifier is not joined to said user's vascular fingerprint and is generated without any identification information of said user and in that said generated numerical identifier is specific to said data detection.

According to particular features, the biometric authentication system further comprises a first server being to receive and to transmit a numerical identifier generated by the detection device, said first server comprises a data generation unit capable of generating codes by using a place, a date and anonymous information or a logistic or medical parameter transmitted by the detection device, and in that said first server does not contain any identity of the user.

The biometric authentication system comprises a second server, the first server and the second server being connected via a secure network, said second server comprising a code database, a code receiving unit, and a correspondence determination unit, the code receiving unit being adapted to convert the transmitted code from the first server, to extract and generate a unique code. The code database is capable to store the converted codes according to the parameters, and in that the correspondence determination unit is able to compare the codes generated by the code receiving unit with the codes contained in the database code to determine an adequacy or not.

According to particular features, the detection device also comprises an additional code belonging to a person who holds said detection device. Thus, the code receiving unit of the second server is able to analyze said additional code received to determine the presence of said code in the database.

According to particular features, the codes generated by the data generation unit of the first server are included in a multimedia message service (MMS) in the form of a tag associated with useful data, after a final cryptographic encoding, said MMS is saved on a mobile phone or on a computer or tablet, said computer or tablet being connected to the detection device, and in that said MMS is transmitted, according to a standard protocol, to the receiving unit of the second server.

According to particular features, the second server comprises a code extraction unit capable of decrypting the message, via a decryption algorithm, and then extracting said tag so as to define the place, the date, the detection device and the person holding the device, as well as the useful data of the message, said tag being processed via the correspondence determination unit so as to be able to insert the useful data of the message into a database, the user being able to access said data via a secure internet portal.

According to particular features, the second server is able to send a new encoding information, with a different algorithm, to said detection device to remake the last input, in the case that the extracted code is unknown but has similarities and important differences with an existing code in the database, and in that said second server further comprises a parameter generating unit adapted to generate a unique specific parameter used to re-convert said tag into a reconverted code, in that the receiving code unit of said server is able to generate a unique specific template corresponding to said reconverted code, and in that the correspondence determination unit compares said unique specific template with the codes contained in the database in order to determine an adequacy or not.

According to particular features, the authentication system is characterized in that it is able to securely manage a bidirectional transmission of anonymous data so as to securely manage the exchange of medical data or other sensitive data.

The invention also relates to a non-nominative resilient biometric authentication method based on venous networks implemented in the above system comprising the following steps:

a) illuminating a body part of a user with a preferably near infrared light;
b) capturing a first area of the illuminated part by means of a detector;
c) extracting an image obtained from said first area,
d) normalization of said image according to a predefined standard and processing said normalized image in order to extract vascular fingerprint therefrom;
e) segmentation of said normalized image and extraction of a tree structure and then search for a longest segment to be characterized;
f) mathematical characterization of nodes of said segment;
g) matrix characterization of said nodes followed by initial encoding;
h) application of an algorithm of the sequence matrix and matrix encoding of the sequence;
i) extracting an alphanumeric result of said matrix encoding and mixing the results according to the algorithm;
j) applying the Luhn algorithm to said alphanumeric result;
k) Encoding of the application: encoding the reader and/or encoding the version and an algorithm number and/or encoding the date;
l) final cryptographic encoding and result integration in a multimedia messaging service (MMS);
m) backup and transmission of the MMS according to the standard transmission protocol to a receiver integrated in the second server;
n) receiving and decoding the MMS with extraction of the code and deleting non-useful metadata in the message;
o) application of the matrix comparison algorithm;
p) inserting said obtained code into a template database included in the second server;
q) possible sending of new encoding information to the detection device.

The invention further relates to the iteration of steps a) to i) of the above biometric authentication method, on another part of the body, and then the fusion encoding according to a fusion algorithm of the two resulting codes of each part of the body, resulting in an alphanumeric result of said matrix encoding.

The invention further relates to the iteration of steps a) to i) of the above biometric authentication method, on another person present during an action, then the encoding by concatenation or fusion according to a fusion algorithm of the two codes resulting from the parts of the body of each person, resulting in an alphanumeric result of said matrix encoding such that the result contains the unique codes of two distinct person but concerned by the same action.

The invention also relates to the use of the above system as an encoding system that can anonymously mark the exchange of information by SMS or MMS or Email from biometric information.

The invention also relates to the use of the above authentication system to exchange anonymous information between a patient, a health provider, a contact center, or other location containing medical personnel and eHealth and database applications.

The invention also relates to the use of the above biometric authentication system in communication systems and in particular to the authentication of the anonymous information contained in messages such as those used in digital communication systems.

The invention also relates to the use of the above biometric authentication system in communication systems and in particular to the authentication of the anonymous information contained in messages by means of two or multiple different codes from the same input but intended to transmit different anonymous information or possibly similar to different servers.

BRIEF DESCRIPTION OF FIGURES

Other features, details and advantages of the invention will emerge on reading the description which follows, with reference to the appended figures, which illustrate.

For clarity, identical or similar elements are identified by identical reference signs throughout the figures.

DETAILED DESCRIPTION OF AN EMBODIMENT

According to one aspect of the present invention, there is provided a biometric system, wherein a detection device, operating as a client of a first server, encodes the biometric parameters and transmits to the first server the result of said encoding, which combines the extracted biometric parameters with a unique identifier without any identification information of a user. The first server then transmits to a second server called receiving server, the result of a encoding combining multiple parameters, the two servers being connected via a preferably secure network.

Figure 1:
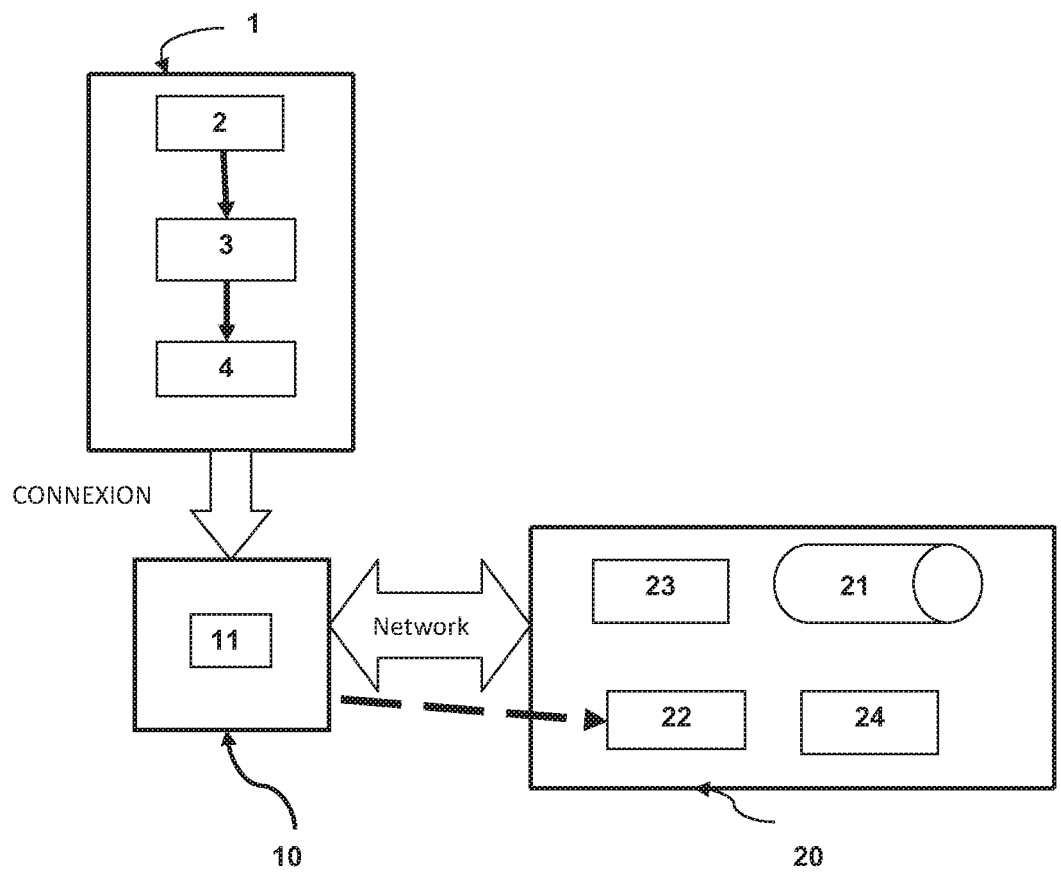
FIG. 1 illustrates the biometric authentication system according to the present invention.

According to the representation of FIG. 1, the system comprises an infrared light source to illuminate a body part of a user, the body part may be a hand, all or part of a person's face, the retina, or any other part of the body. The infrared light has a wavelength between 760 and 940 nm. The system also comprises a detection device 1. This device is composed of a sensor 2, to capture a venous network of the light-illuminated part and thus obtain biometric information, and several units. First, a biometric feature extraction unit 3, whose role is to extract a quantity features (template) from the biometric information obtained by the sensor 2 and thus generate a vascular fingerprint. The device 1 further comprises a biometric feature conversion unit 4 for converting the vascular fingerprint into a numerical identifier. To convert the vascular fingerprint into a variable numerical (digital) identifier, the conversion unit 4 uses an encoding algorithm that combines the serial number of the device 1 with the extracted quantity of characteristics (features). This serial number will be considered as a internal parameter to the device 1 and enables, subsequently, to associate a fingerprint to the detection device 1 having made the acquisition.

According to the representation of FIG. 1, the system comprises an infrared light source to illuminate a body part of a user; the body part may be a hand, all or part of a person's face, the retina, or any other part of the body. The infrared light has a wavelength between 760 and 940 nm. The system also comprises a detection device 1. This device is composed of a sensor 2, to capture a venous network of the light-illuminated part and thus obtain biometric information, and several units. First, a biometric feature extraction unit 3, whose role is to extract a quantity features (template) from the biometric information obtained by the sensor 2 and thus generate a vascular fingerprint.

In order to be able to apply an encoding algorithm, the vascular fingerprint of an input area, which is in the form of one or more images of the same area of the same person, has been segmented, a tree structure has been extracted, and a segment (usually the largest segment but not exclusively) of said tree structure was chosen. Then, it has been preceded of a matrix characterization of the nodes of said segment. The initial encoding is performed by the application of an algorithm of the sequence matrix, thus it has been preceded of a extraction of the result of the alphanumeric encoding. The formula of Luhn (or Luhn Algorithm) is then applied to validate the result.

The numerical (digital) identifier resulting from the conversion unit 4 of the detection device 1 is considered to be variable because it is not joined to the vascular fingerprint itself. Indeed, the same operation performed with another detection device, therefore having a different serial number, will not have the same result. Moreover, it is also important to note that the resulting digital identifier does not include any identification of a user, in fact, the first server 10 and the detection device 1 do not require the input of an identifier of a user. The device 1 then transmits this variable digital identifier to the first server 10, said device 1 and said first server 10 operating in a Client/Server environment.

The first server 10 also comprises a data generation unit 11. The data generating unit 11 generates data by using a place, a date, and anonymous logistic or medical information transmitted by the detection device 1. A final encoding of the above parameters and the digital identifier is then performed. Said encoding is an alphanumeric sequence in the form of a tag. Said alphanumeric sequence is the final result of all encrypted and concatenated codes together.

The second server 20 comprises a transmitted code database 21, a code receiving unit 22 transmitted in definitive codes, and a correspondence determination unit 23. The transmitted code database 21 stores the transmitted codes. The code receiving unit converts the code corresponding to the code transmitted from the first server 10, in order to extract and generate the unique code said definitive corresponding to each area input. The definitive code database stores the converted codes according to the reader parameters and recodes the quantity of characteristics (features) of the biometric information according to a definitive code for each area entered. The correspondence determination unit 23 compares the definitive code with the codes present in the database 21 to determine a correspondence, or not.

The detection device 1 also includes the resulting code of the person who currently holds the detection device as an additional parameter. The code receiving unit of the second server 20 compares the received code with several user codes to determine whether it is already present in the database, or not. This aspect is particularly adapted for the anonymous transmission of medical information and the registration in database of electronic health records.

Moreover, the codes generated by the data generation unit 11 of the first server 10 may be included in a multimedia message service (MMS) in the form of a tag associated with useful data of a message, after a final cryptographic encoding. The said MMS can be saved on a mobile phone, on a computer, or on a tablet. Said computer or tablet is connected to the detection device 1. The MMS is transmitted, according to a standard protocol, to the reception unit 22 of the second server 20. The codes received in the receiver 22 are decrypted, via a decryption algorithm, and then extracted by an extraction unit 24 of the second server 20. The extraction of the tag defines the place, the date, the detection device 1 and the person who holds the device, as well as the useful data of the message. The tag will be processed via the correspondence unit 23, and the useful data of the message is then inserted into a database. The user can access the useful data of the message via a secure internet portal.

According to another aspect of the present invention, the second server 20 can send an new encoding information, with a different algorithm, to said detection device 1 by asking it to recreate the last biometric template entry, in case of the extracted code is unknown but has similarities and significant differences with existing code in the database. In addition, the second server 20 also includes a parameter generation unit (not shown in FIG. 1), thereby generating a unique specific parameter used to convert the label into a reconverted code. In this case, the code receiving unit 22 of said server 20 generates a unique specific code corresponding to the reconverted code and the correspondence determination unit 23 compares said unique specific code with the codes contained in the database 21 in order to be able to determine an adequacy or not.

In this way, the system of the present invention is capable of securely managing bidirectional transmission of anonymous data, and thus managing the exchange of medical data or other sensitive data. Therefore, it is not necessary to manage all the parameters on the user side in the system. Thus, the user does not need to own a token or memorize secret information, such as a password. Therefore, a highly available and resilient biometric authentication can be obtained with the system described above.

Figure 2:
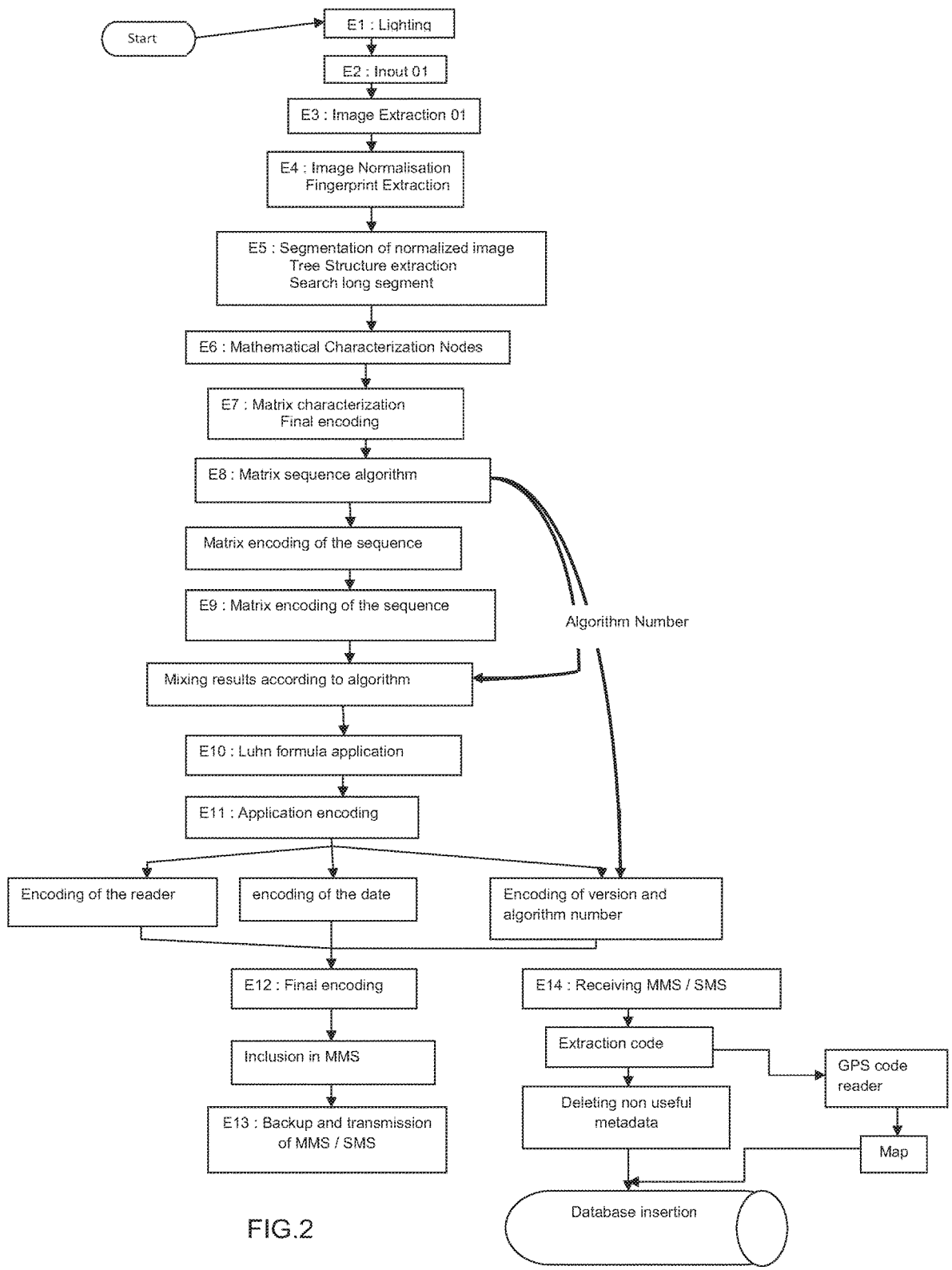
FIG. 2 illustrates a flow diagram showing the various steps of the method according to the invention.

The invention also relates to a non-nominative resilient biometric authentication method based on venous networks implemented in the above system. FIG. 2 represents the different steps of the method according to the invention. The first step consists to illuminate a part of a user's body with near-infrared light with a wavelength between 760 and 940 nm and capture with a detector (sensor) of a first area of the illuminated part. The next step consists to extract an image obtained from the first area, said image will be normalized to a predefined standard and then be processed to extract vascular fingerprints. The normalized image will be segmented and a tree structure is extracted. In the present invention, in the next step, a longer segment is searched and then a characterization of the nodes of said segment is performed, then a matrix characterization of said nodes followed by initial encoding. The next step consists in the application of an algorithm of the sequence matrix, then a matrix encoding of the sequence and finally the extraction of an alphanumeric result.

According to the type of biometric fingerprint desired, it is possible to perform the above steps on another part of the body of the same person, then the encoding by concatenation or fusion according to a fusion algorithm of the two codes resulting from each part of the body, resulting in an alphanumeric result of the matrix encoding. Also, it is possible to perform the steps above on another person present during the same action, then to proceed to the application of a fusion algorithm of the two codes resulting from the parts of the body of each person, resulting in an alphanumeric result of the matrix encoding. In this case the result contains the unique codes of two separate person but concerned by the same action.

The method further comprises the following steps: the application of the Luhn algorithm, or the application of the Luhn formula, on the alphanumeric result and then an encoding of the reader and/or encoding of the version and an algorithm number and/or date encoding. Then, we proceed to the final cryptographic encoding and then integrate the result in a multimedia messaging service (MMS). The MMS will be saved and transmitted according to the standard protocol of transmission to a receiver integrated into a reception server (second server). The next step consists in decoding the MMS with the extraction of the code and the deletion of the non-useful metadata in the message and then the application of the matrix comparison algorithm. According to the result of the comparison, said obtained code will then be inserted into a database of definitive code of the second server. In the case where the obtained code has similarities and the important differences with an existing code in the code database, the server may optionally send a new encoding information to the detection device in order to perform a new entry.

Figure 3:
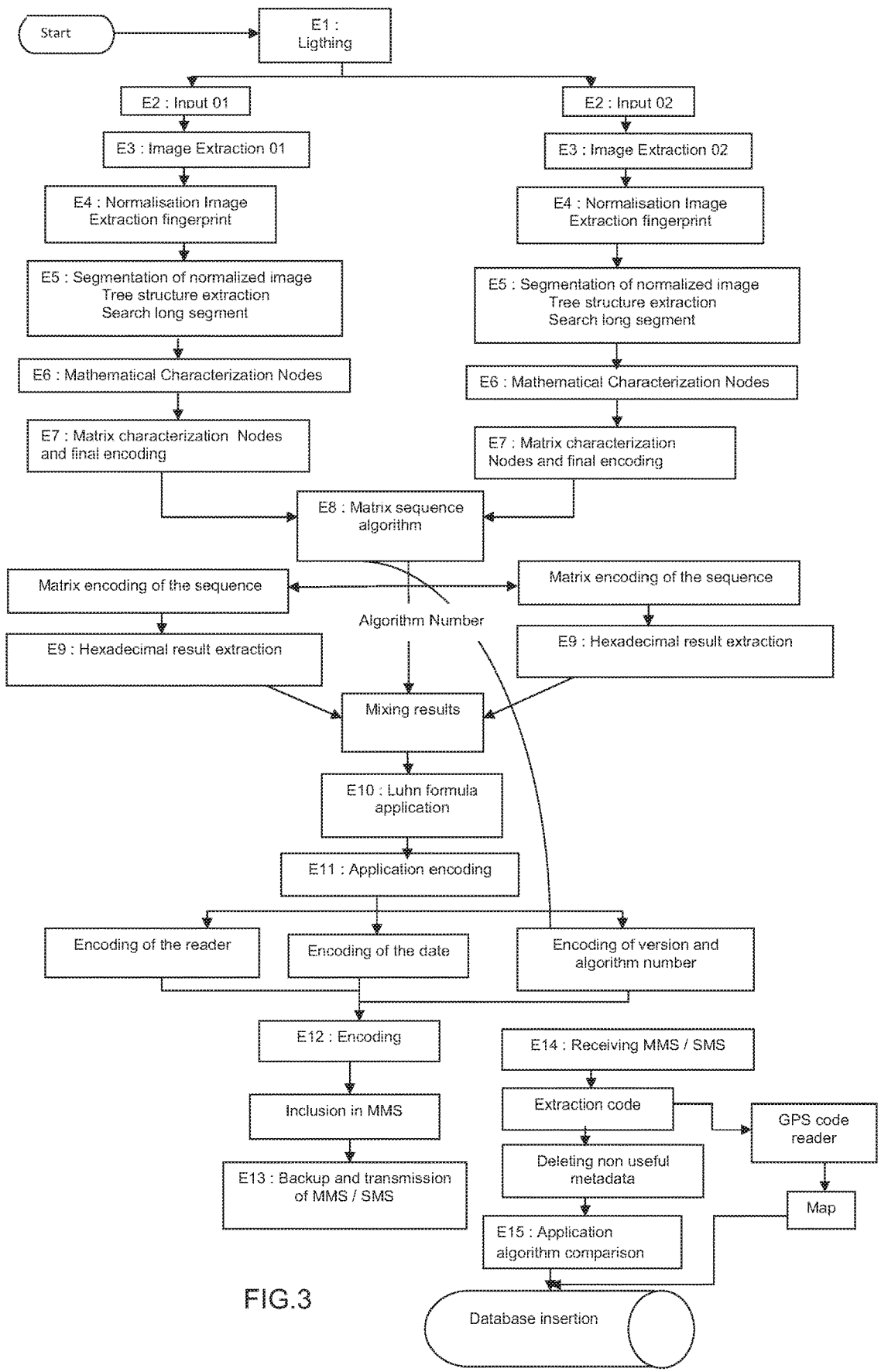
FIG. 3 illustrates a flow diagram showing the different steps of the method in the case of the iteration of the method steps on another part of the body or on another person.

FIG. 3 shows the diagram of the biometric authentication of another part of the body of the same user or the biometric authentication of another person participating in a common action with the user, for example, a health care provider.

Therefore, the present invention provides a method for using biometrics generated codes, in a resilient, non-definitive and anonymous manner. In addition, the method, as described above in these different steps, allows reducing the format of the biometric characteristic quantities to certain specific codes provided by the algorithms.

Considering that the "sensitive information" refers to the information that can be extracted or otherwise obtained by analyzing the signal transmitted between the client and the server, the extraction of the marking information and/or a combination of signals, the present invention provides a method for anonymously marking sensitive information. The method implemented in the system according to the present invention allows a transfer of "sensitive information" without any reference to an identifiable origin. The present invention provides a method of transferring "sensitive information" encoded according to a specific code resulting from the extraction of the biometric characteristics.

The invention also relates to the use of the system according to the present invention as an encoding system that can anonymously mark the exchange of information by SMS or MMS or E-mail from biometric information.

The invention further relates to the use of the system according to the present invention in communication systems and in particular the authentication of anonymous information contained in messages such as those used in digital communication systems.

The invention further relates particularly to the use of the authentication system according to the present invention for exchanging anonymous information between a patient, a health provider, a contact center, or another location containing medical personnel and eHealth and database applications.

In medical applications, the message is to be maintained anonymously, but contains what is called the "useful data" relating to information or actions performed by the health care provider. For example, the messages may include simple sensor status reports and health provider commands. The data transmission bandwidth being limited, the use of the system according to the invention is particularly of interest. Indeed, the system is able to authenticate the message with anonymous and cancelable biometric fingerprints without thereby increasing the message with a large amount of data.

The biometric characteristics code is generated using a unidirectional algorithm that produces an alphanumeric code. The code is then encrypted and sent to a receiver that will integrate the information received as part of an anonymous and unique tag for data exchange. This code is called BAK (Biometric Anonymous Keycode) or anonymous biometric encoding key. Similar algorithms, but with different encoding results can be used in the detection device system. The same amount of biometric characteristics (or biometric templates) can be converted by different algorithms and parameters to register different codes in the respective systems. With this configuration, if a template is disclosed from one of the systems, the security of the other systems cannot be impaired.

Each BAK is unique in that the resulting code is rarely exactly identical between two series of data collection from the same person, performed by the same detector (sensor), and encoded by the same algorithm, but contains a similarity and sufficient reproducibility to allow comparison between two BAKS generated under similar conditions. The comparison allows the exclusion of false rejections, but also false acceptances based on the degree of similarity of the amount of biometric characteristics between two individual biometric encoding areas.

It is possible to consider that the BAK code is similar to a genetic code whose sequences are similar without being identical between two persons. Each BAK is unique and secured by a Luhn formula or other cryptographic method to prevent manipulation attempts. A comparison between two absolutely identical BAKs allows the exclusion of copy attempts. The information concerning the BAK is not registered in the detection device, but since it is resilient and never exactly identical, it can be printed or sent by SMS to the user of a mobile phone. The way in which the message containing the alphanumeric code is sent to the user of a mobile phone is made in such a way that the BAK can be visible and readable by the user, but can also be encrypted in the useful data of the message.

With respect to authentication based on cards or passwords, biometric authentication, to authenticate a user based on his biometric data, has the advantage of not being lost, forgotten, or stolen. Thus, it is possible to provide highly available authentication with high resistance to identity theft. In the system according to the present invention, at the end of the reception, the message is received with a unique BAK or coupled with the BAK of the administrative clerk or the health worker or the provider. (For example, laboratory results may thus be included by the invention). The concatenation of the different BAKS of the stakeholders constitutes the BAK marking of the message. The BAK marking of a message is then constituted by the combination of codes that can be calculated and are unique for the user, the patient and the care provider.

The message data may include simple patient status reports, and health provider orders or any of the necessary health care information, provided that the BAK marking is present.

In multimedia message services (MMS) for which the data transmission bandwidth is limited, encryption and concatenation, as well as compression and decompression, can be used without altering the BAK information and the marking of the health message. The mobile receiver of the health worker's does not necessarily need to calculate the tag of the message, as a health worker, it only has to respond, or not, the same message.

The other receivers, PDAs, computers, etc. must be equipped to calculate the received data and order the messages according to the BAK tag of the message to order the patient data in the patient record, administrative data and health worker data that has been decided.

The anonymization operation is performed on the basis of an exchange of codes from biometric data. The codes are calculated by algorithms based on the recognition of one or more venous networks for example or by any other biometric means. The code is an alphanumeric result derived from a calculation based on the location and the characteristic aspects of certain parts of the anatomical body of the person (s) involved in the data exchange (the participants). The biometric code is calculated each time by a biometric identification device and transmitted either in the form of a short message on a designated receiver, or printed, or registered as the identifier formed in a badge, for example. This is the codes derived from the biometric data which, after the data exchange made, allow reconstituting the complete file and the data of the participants without having to name them.

To enhance security, the system according to the present invention is configured so that the exchange of biometric codes to form the tag of the message is performed in an automated and encrypted manner. Advantageously, the system according to the present invention is configured to secure a bidirectional transmission of data, for accessing to a confined space, in particular to a motor vehicle, consisting in establishing a remote exchange of data between an installed identification device in the confined space and an identifier. This identifier may be consisting of an ordered sequence by concatenating the biometric codes of the participants according to predetermined algorithms.

Furthermore, the method according to the present invention, at the short message control device, can add the sequence of biometric codes to the message control information. This information can then optionally be sent to medical personnel (for example to a contact of a monitoring center) and/or to a remote server via a gateway device. The gateway device preferably communicates via SMS or MMS.

The present invention describes a system and method for providing a simple and anonymous message marking system. Indeed, the present invention allows such encoding to mark, preferably, the SMS information in the field of medical information on a user, a patient, and/or a health professional by calculating first a code from a biometric value of the user, the patient and the health professional.

The marking values are values that are generated by the biometric characteristics of a part of the vascular fingerprint of a user, a patient and a care provider. The markup file is attached to the outgoing message, which may be addressed to an associated network node, to a unified messaging mailbox of the called party.

Many combinations can be envisaged without departing from the scope of the invention, the person skilled in the art will choose one or the other depending on the economic, ergonomic, dimensional or other constraints that must be respected.

The invention claimed is:

1. A non-nominative, resilient biometric authentication system based, on the venous network comprising an infrared light source for illuminating a body part of a user, and a detection device, the system comprising:
   a sensor for non-contact capturing a venous network of said body part, that obtained the biometric information;
   an extraction unit of biometric characteristics;
   a conversion unit of the biometric characteristics, the detection device (1) having a unique identifier, wherein the extraction unit of the biometric characteristics extracts a quantity of characteristics from the biometric information obtained by the sensor;
   a means for extracting an image obtained from a first area of said body part, normalization of said image according to a predefined standard and processing said normalized image, segmentation of said normalized image and extraction of a tree structure and then search for a longest segment, mathematical characterization of nodes of said segment, matrix characterization of said nodes followed by initial encoding and application of an algorithm of the sequence matrix and matrix encoding of the sequence in order to generate a vascular fingerprint;

wherein the conversion unit of biometric characteristics converts said vascular fingerprint, via an encoding algorithm and combining the device identifier with the extracted characteristics, into a variable numerical identifier, so that said variable numerical identifier is not joined to said user's vascular fingerprint and is generated without any nominative identification information of said user and is specific to said data detection device;

wherein, the system further comprising a first server and a second server;

wherein the first server receives the variable numerical identifier generated by the detection device, said first server comprising a data generation unit, for generating the data by using a place, a date and anonymous information or a logistic parameter such as a coding of the reader and/or coding of a version and a number of the used algorithm or a medical parameter transmitted by the detection device, and then proceeds to a final encoding of the parameters and of the variable numerical identifier, said final encoding is an alphanumeric sequence which is the final result of all encrypted and concatenated codes together;

wherein the first server and the second server are connected via a secure network and operating as a client/server;

wherein the second server comprises a code database, a code receiving unit, and a correspondence determination unit, wherein upon said second server receiving of the final encoding by means of the code receiving unit, the said code receiving unit converts the final encoding in order to extract and generate a unique code, the code database storing the unique code generated by the code receiving unit, and the correspondence determination unit compare the code generated by the code receiving unit with the codes presents in the code database in order to determine a correspondence, or not; and wherein said system performs the steps of:

a) illuminating a body part of a user by means of an infrared light;

b) capturing a first area of the illuminated part by means of a detector included in a detection device, having a unique identifier;

c) extracting a quantity of characteristics from the biometric information obtained by the sensor, by means of a extracting unit included in the detection device, and generating a vascular fingerprint, by extracting an image obtained from the first area;

d) normalization of said image according to a predefined standard and processing said normalized image;

e) segmentation of said normalized image and extraction of a tree structure and then search for a longest segment;

f) mathematical characterization of nodes of said segment;

g) matrix characterization of said nodes followed by an initial encoding;

h) application of an algorithm of the sequence matrix and matrix encoding of the sequence;

i) conversion of the vascular fingerprint, via an encoding algorithm, combining the device identifier with the extracted characteristics, into a variable numerical identifier, by means of a conversion unit included in the detection device;

j) transmit the variable numerical identifier into a first server;

k) generate the data by using a place, a date and anonymous information or a logistic parameter such as a coding of the reader and/or coding of a version and a number of the used algorithm or a medical parameter by means of a generation unit included in the first server;

l) proceeds to a final encoding of the parameters and of the variable numerical identifier by means of the generation unit, said final encoding is an alphanumeric sequence which is the final result of all encrypted and concatenated codes together;

m) integration of the final result in a multimedia messaging service (MMS);

n) backup the MMS;

o) transmission of the MMS according to the standard transmission protocol to a receiving unit integrated in a second server;

p) receiving and decoding the MMS with extraction of a unique code and deleting non useful metadata in the message by the means of the receiving unit;

q) inserting the unique code into a code database included in the second server; and r) comparing the code generated by the code receiving unit with the codes presents in the code database in order to determine a correspondence or not by means of a correspondence determination unit included in the second server.

2. The system according to claim 1, wherein the detection device further comprises an additional code belonging to a person who holds said detection device, and in that said unit receiving code of the second server is adapted to analyze said additional code received to determine the presence of said code in the code database.

3. The system according to claim 2 wherein the codes generated by the data generation unit of the first server are included in a multimedia messaging service (MMS) under the form of a tag associated with useful data, after a final cryptographic encoding, in that said MMS is saved on a mobile phone or on a computer or tablet, said computer or tablet being connected to the detection device, and said MMS is transmitted, according to a standard protocol, to the receiving unit of the second server.

4. The system according to claim 3 in which the second server comprises a code extraction unit (24) for decrypting the message, via a decryption algorithm, and then extracting the tag from so as to extract the place, the date, the detection device (1) and the person holding the detection device (1), as well as the useful data of the message, said tag being processed via the correspondence determination unit (23) so as to be able to insert the useful data of the message into a database, the user being able to access said data via a secure internet portal.

5. The system according to claim 2 wherein said system is able to securely manage a bidirectional transmission of anonymous data so as to securely manage the exchange of medical data or other sensitive data.

6. The system of claim 1, further comprising the iteration of steps a) through c) on another part of the body of the user, and then the fusion encoding according to a fusion algorithm of the two resulting codes of each part of the body resulting in an alphanumeric result of said matrix encoding.

7. The system of claim 1, further comprising the iteration of the steps a) through c) on another person present during an action, then the encoding by concatenation or fusion according to an algorithm of fusion the two resulting code from the parts of the body of each person, resulting in an alphanumeric result of said matrix encoding such that the result contains the unique codes of two distinct person but concerned by the same action.

8. The system of claim 1 wherein said system is used for communication and in particular to authentication of anonymous information contained in messages such as those used in digital communication systems.

9. The system of claim 1 wherein said system is used for exchanging anonymous information between a patient, a health provider, a contact center, or other location containing medical personnel and ehealth and database applications.

* * * * *